United States Patent
Anders et al.

(10) Patent No.: US 9,031,887 B2
(45) Date of Patent: May 12, 2015

(54) DETERMINING A REPLACEMENT DOCUMENT OWNER

(71) Applicant: International Business Machines Corporation, Armonk, NY (US)

(72) Inventors: Kelley L. Anders, East New Market, MD (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/719,050

(22) Filed: Dec. 18, 2012

(65) Prior Publication Data

US 2014/0172768 A1    Jun. 19, 2014

(51) Int. Cl.
| | |
|---|---|
| G06N 5/00 | (2006.01) |
| G06Q 10/00 | (2012.01) |
| G06F 21/30 | (2013.01) |
| G06N 5/04 | (2006.01) |
| G06Q 10/10 | (2012.01) |
| G06F 21/10 | (2013.01) |
| H04L 29/06 | (2006.01) |

(52) U.S. Cl.
CPC .............. *G06F 21/30* (2013.01); *G06N 5/046* (2013.01); *G06Q 10/10* (2013.01); *G06F 21/105* (2013.01); *H04L 63/10* (2013.01); *H04L 2463/101* (2013.01)

(58) Field of Classification Search
None
See application file for complete search history.

(56) References Cited

U.S. PATENT DOCUMENTS

| | | | |
|---|---|---|---|
| 5,490,261 | A | 2/1996 | Bean et al. |
| 6,618,717 | B1 | 9/2003 | Karadimitriou et al. |
| 2005/0188424 | A1 | 8/2005 | Kizyman |
| 2007/0260627 | A1 | 11/2007 | Knittel et al. |
| 2009/0024534 | A1* | 1/2009 | Sevrain ........................... 705/80 |
| 2009/0254971 | A1* | 10/2009 | Herz et al. ........................ 726/1 |
| 2009/0271274 | A1* | 10/2009 | Baunach .................... 705/14.73 |
| 2010/0023371 | A1* | 1/2010 | Hartz et al. ..................... 705/10 |
| 2010/0153282 | A1* | 6/2010 | Graham ........................ 705/310 |
| 2011/0167012 | A1 | 7/2011 | Jenkins et al. |
| 2011/0202420 | A1* | 8/2011 | Alrasheed .................... 705/26.2 |
| 2012/0066142 | A1 | 3/2012 | Jenkins et al. |
| 2014/0172769 | A1 | 6/2014 | Anders et al. |

OTHER PUBLICATIONS

Reeker, LH. et al.; "The Interplay of Semantic and Surface Structure Acquisition"; http://www.ip.com/pubview/IPCOM000150750D; Apr. 19, 2007. (Originally presented at the International Psychology of Language Conference, Stirling, Scotland, Jun. 1976.).

IBM; "A framework for interconnected semantic data"; http://www.ip.com/pubview/IPCOM000188449D; Oct. 8, 2009.

(Continued)

*Primary Examiner* — Alan Chen
(74) *Attorney, Agent, or Firm* — Janaki K. Davda; Konrad, Raynes, Davda & Victor LLP

(57) ABSTRACT

Provided are a method, computer program product, and system for generating a recommendation for transfer of ownership of content. At least one characteristic of a first owner is determined. At least one characteristic of the content is determined. A second owner for the content is determined based on the at least one characteristic of the first owner, and the at least one content characteristic. The recommendation for transfer of ownership is generated, based at least in part on the determination of the second owner.

14 Claims, 5 Drawing Sheets

(56) References Cited

OTHER PUBLICATIONS

Office Action 1, Oct. 20, 2014, for U.S. Appl. No. 13/949,713, filed Jul. 24, 2013 by K.L. Anders et al., Total 9 pp.

Response to Office Action 1, Dec. 19, 2014, for U.S. Appl. No. 13/949,713, filed Jul. 24, 2013 by K.L. Anders et al., Total 6 pp.

Notice of Allowance 1, Jan. 14, 2015, for U.S. Appl. No. 13/949,713, filed Jul. 24, 2013 by K.L. Anders et al., Total 7 pp.

* cited by examiner

DETERMINING A REPLACEMENT DOCUMENT OWNER

BACKGROUND

This invention relates to assigning ownership for content in a content management system. An enterprise content management system (ECMS) supports organizing, managing, and publishing of content (e.g. electronic documents, audio files, video files). Each instance of content stored in the ECMS is assigned an owner. The content owner may have certain responsibilities for the content, such as providing editorial oversight, maintaining an access list, and performing workflow processes (e.g. reviewing, approving, publishing, updating). Content ownership may become invalid, and need to be transferred to a replacement owner, when the owner is no longer available, or responsible for the content. Content ownership may become invalid for a number of reasons including: change of employment, change of positions for the same employer, business changes, or extended absence. Generally, a replacement owner is not assigned until some action is needed on the content. This need for a content owner may not arise until a substantial period of time after the ownership becomes invalid. Even if the previous owner is still available, that owner may no longer have the knowledge to properly determine a replacement owner. Further, the time it takes to determine a replacement owner causes an unnecessary delay in processing the content. Thus, there is a need to determine a replacement content owner in a timely and well-ordered fashion.

SUMMARY

Provided are a method, computer program product, and system for generating a recommendation for transfer of ownership of content. At least one characteristic of a first owner is determined. At least one characteristic of the content is determined. A second owner for the content is determined based on the at least one characteristic of the first owner, and the at least one content characteristic. The recommendation for transfer of ownership is generated, based at least in part on the determination of the second owner.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvements over technologies found in the marketplace, or to enable others of ordinary skill in the art to understand the embodiments disclosed herein.

Figure 1:
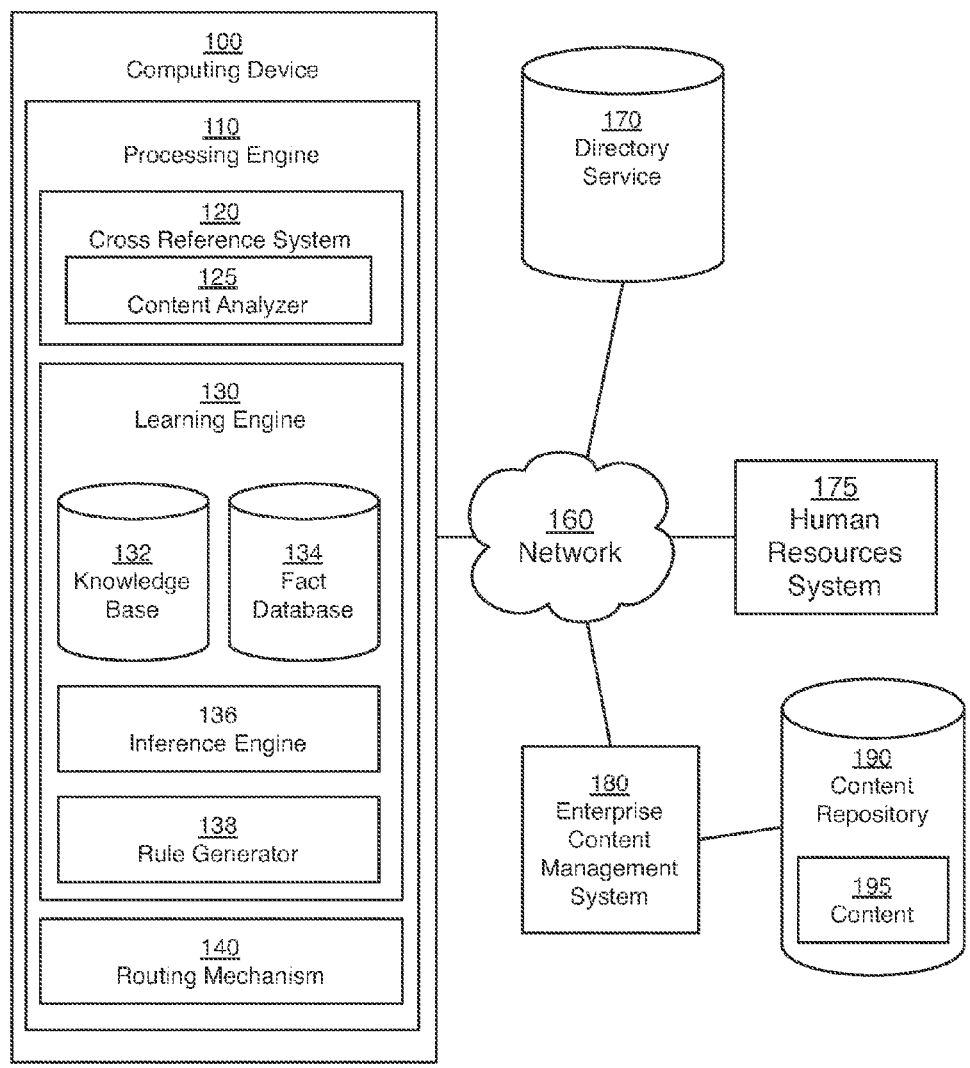
FIG. 1 illustrates, in a block diagram, a computing architecture in accordance with certain embodiments.

FIG. 1 illustrates, in a block diagram, a computing architecture in accordance with certain embodiments. A computing device 100 has a processing engine 110, and is coupled to a network 160, which includes a directory service 170, a human resources (HR) system 175, and an enterprise content management system (ECMS) 180. The ECMS 180 is coupled to a content repository 190 which contains at least one content 195. In an embodiment, the directory service 170 contains employee contact information, job responsibilities, and department organization information (e.g. other members of the department, department manager, and the management chain). The human resources system 175 provides detailed employment history information including past job responsibilities, departments, and managers. The ECMS 180 manages content 195 (e.g. documents, presentations, and unstructured data) and includes metadata (data about the content) for each content 195. The ECMS 180 has mechanisms for establishing and transferring content ownership.

The processing engine 110 includes a cross reference system 120, a learning engine 130, and a routing mechanism 140. The cross reference system 120 includes a content analyzer 125. In an embodiment, the processing engine 110 receives content with invalid ownership and gathers facts from the directory service 170, human resources system 175, and the ECMS 180. The facts are presented to the learning engine 130 which attempts to determine a replacement owner based on those facts. In an embodiment, the learning engine consists of a knowledge base 132 containing information from previous ownership transfers; if the facts presented to the learning engine are compared to facts in the knowledge base 132 and a determination is made based on the results of previous ownership transfers. If the learning engine 130 does not make a determination then the cross reference system 120 makes the determination as described below in FIG. 3. The processing engine 110 takes the determination (whether provided by the learning engine 130 or the cross reference system 120) and generates a recommended transfer of ownership. The processing engine 110 uses the recommendation to route a request with the routing mechanism 140 to the recommended owner to accept ownership of the content 195. The recommended owner responds, and the response is fed to the learning engine 130 to add to the knowledge base 132. In certain other embodiments the learning engine 130 is a rule-based knowledge-based system, and the knowledge base 132 contains inference rules. Inference rules are used to express knowledge—often taking the form: if "condition" then "conclusion." The rules are applied to facts, stored in the fact database 134. Facts are unconditional statements that are assumed to be correct at the time that they are used. The collection of facts that are known to the system (whether derived by rules or supplied directly) at any given time is stored in the fact database 134. In an embodiment, the fact database 134 is implemented in computer memory. The inference engine 136 interprets the rules from the knowledge base 132 and applies the facts from the fact database 134. In an embodiment the inference engine applies a forward chaining strategy for deciding which rules to apply and when to apply them. In forward chaining the rules are selected and applied in response to the current fact database 134. Initially the rules in the knowledge base 132 consist of metarules and base rules. The metarules express knowledge about how the knowledge should be applied (rules about knowledge), and the base rules express knowledge already known. As requests are processed by the routing mechanism 140 the results are fed to the learning engine 132 and the rule generator 138 takes the facts and resulting response to create a new rule to apply to the knowledge base 132.

Figure 2:
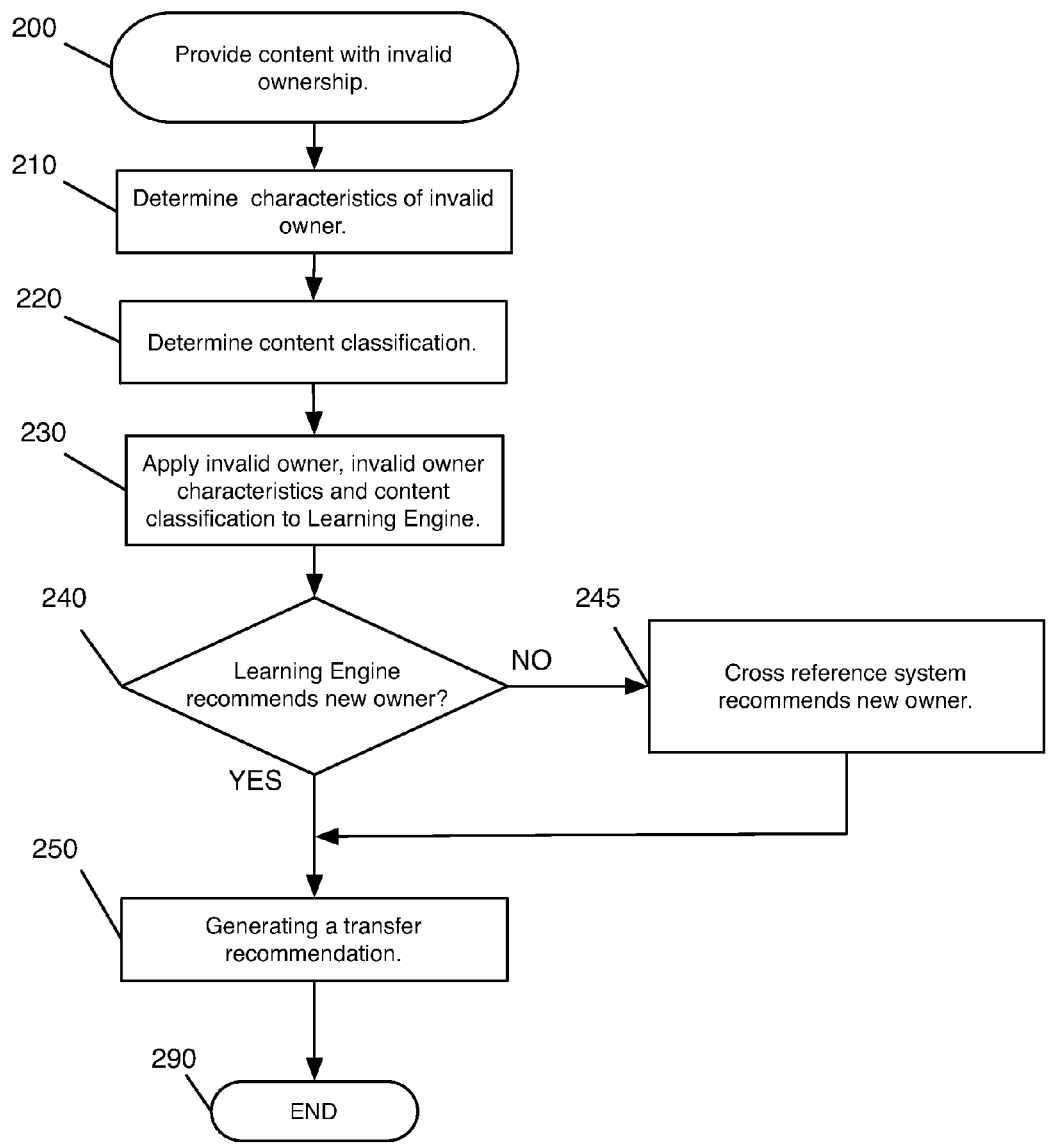
FIG. 2 illustrates, in a flow diagram, generating a recommendation for transfer of ownership of content, in accordance with certain embodiments.

FIG. 2 illustrates, in a flow diagram, generating a recommendation for transfer of ownership of content, in accordance with certain embodiments. Processing begins with block 200 where the processing engine 110 is provided with content 195 having invalid ownership. Ownership may be declared invalid as a result of an HR process that processes employment changes or transfers, or through some other means (e.g. entry through a user interface). Ownership may be determined invalid through a number of methods including a search for the owner in the employee directory, or a search for authorized users in the ECMS. Processing continues to block 210 where the characteristics of the invalid owner are determined. In certain embodiments characteristics may include the organizational department the invalid owner was a member of during valid ownership. In certain other embodiments the characteristics may include the job title, role, or responsibility of the owner during valid content ownership. In the absence of knowledge about the characteristics during valid ownership, the last known characteristic may be used. In certain embodiments the characteristics may be found in organizational repositories such as the directory service 170 or the HR system 175. The functions providing the characteristics may be provided by the processing engine 110 or the cross reference system 120 or any other component on the computing device 100. Processing continues to block 220 where the content classification is determined. In an embodiment the classification may be determined form the ECMS 180 through a metadata query. Metadata, such as item type, may be used to determine classification. In certain other embodiments a content analyzer 125 is used to determine the classification of the content. In certain embodiments, the content analyzer 125 is based on the IBM Content Classification by International Business Machines Corporation of Armonk, N.Y., which automatically classifies information in unstructured content. Processing continues to block 230, where the processing engine 110 applies the invalid owner, the invalid owner characteristics, and the content classification to the learning engine 130. In decision block 240, if the learning engine recommends a new owner processing continues to block 250, otherwise processing continues to block 245. In block 245, the cross reference system 120 is used to recommend a new owner. Processing continues to block 250 where a transfer recommendation is generated by the processing engine 110. Processing completes at block 290.

Figure 3:
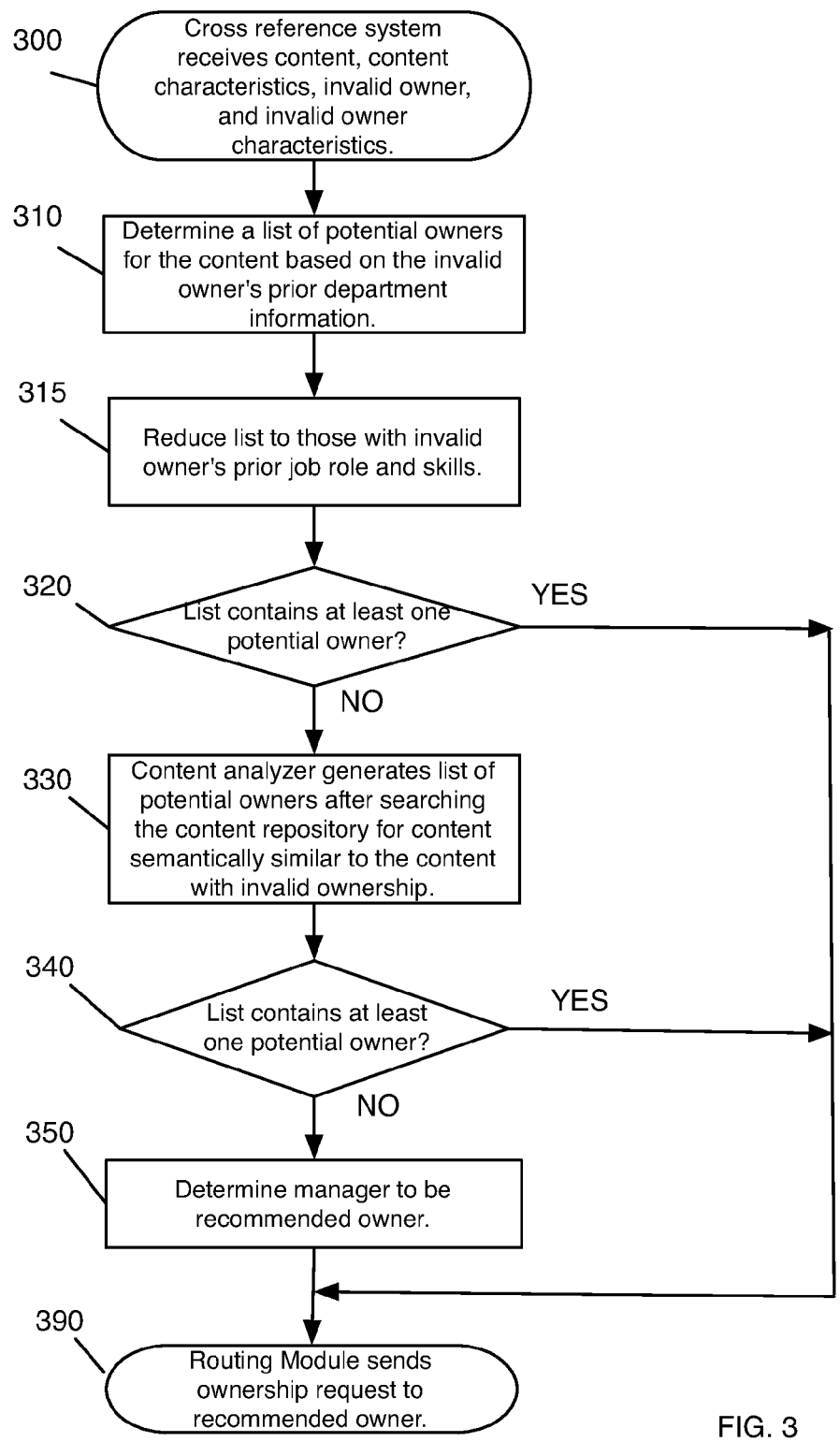
FIG. 3 illustrates, in a flow diagram, the determination of a recommended owner with the cross reference system, in accordance with certain embodiments.

FIG. 3 illustrates, in a flow diagram, the determination of a recommended owner with the cross reference system, in accordance with certain embodiments. Processing begins with block 300 where the cross reference system 120 is presented with an invalid owner, invalid owner characteristics, and content characteristics. In block 310, a list of potential owners for the content is determined using the invalid owner's prior department information. In some embodiments, the human resources system 175 is queried to determine the department of the invalid owner at the time before the ownership became invalid [hereinafter Last Valid Department]; the directory service 170 is then queried to generate a list of potential owners comprising the current members of last valid department. Processing continues with block 315, where the list of potential owners for the content is reduced to only those employees with current job role and skills matching the invalid owner's job role and skills at the time of valid ownership. In some embodiments, the human resources system 175 is queried to determine the job role and skills Processing continues to decision block 320 where it is determined whether the list has any remaining potential owners; if the list has at least one entry then processing continues to block 390, otherwise processing continues to block 330.

In block 330, the content analyzer 125 searches the content repository 190, using the ECMS 180, for semantically similar content to the content with invalid ownership 195. In certain embodiments, the content analyzer 125 searches for content with the same classification as the content 195. Processing continues to block 340 where it is determined whether the list has any remaining potential owners. If the search performed in block 340 results in at least one recommended owner then processing continues to block 390, otherwise processing continues to block 350. In block 350, the directory service 170 is queried to determine the current manager of the Last Valid Department; the manager found is the recommended owner. In Block 390 the routing module generates a request to accept content ownership and send the request to the recommended owner.

Figure 4:
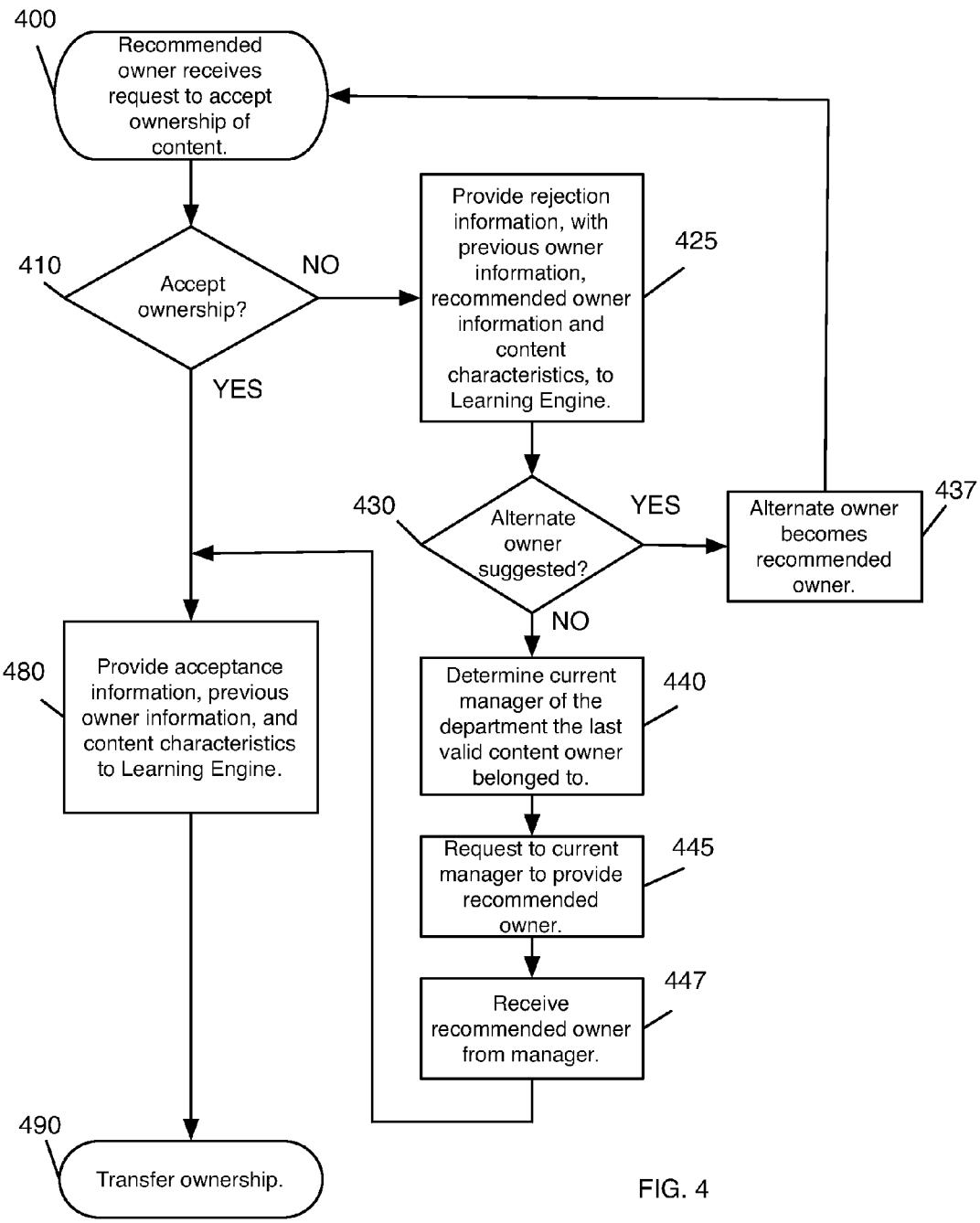
FIG. 4 illustrates in a flow diagram, the recommended owner actions and the feedback to the learning engine

FIG. 4 illustrates in a flow diagram, the recommended owner actions and the feedback to the learning engine. Processing begins with block 400 where a recommended owner receives a request to accept ownership of the content. In decision block 410, the recommended owner accepts or rejects ownership; if ownership is accepted processing continues to block 480. If ownership is not accepted (rejected) processing continues to block 425, where the rejection is provided to the learning engine 130 with the previous owner information, the recommended owner information, and the content characteristics. Processing continues to decision block 430 where it is determined whether the recommended owner provided a suggestion for an alternate owner; if an alternate owner was provided processing continues to block 437 where the alternate owner becomes the recommended owner, followed by block 400, where the current recommended owner receives a request to accept ownership of the content and the process continues as previously described. If an alternate owner was not recommended at decision block 430, processing continues to block 440 where a determination is made as to the current manager of the department the last valid content owner belonged to. From there, processing continues to block 445 where a request to provide a recommended owner is sent to the current manager. Processing continues to block 447 where the recommended owner is received from the current manager.

Processing continues to block 480 where the acceptance information, the previous owner information and the content characteristics are provided to the learning engine 130. Processing continues to block 490 where the content ownership is transferred with the ECMS 180.

Previous methods for addressing invalid content ownership relied on the ECMS 180 account management. If a user account was removed, then access to the content owned by the account was disabled until a valid account could be assigned. Transferring ownership was a task performed by an administrator, thereby requiring additional time and expense. This previous method did not provide a well ordered solution for content owners that changed positions and continue to have valid ECMS 180 accounts.

The content repository 190 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The content store 110 and the content repository 160 may be implemented in the same or different storage devices. The network 160 may comprise an interconnected network (e.g., Intranet, Internet, Local Area Network (LAN), Storage Area Network (SAN), etc.) or comprise direct cable connections between the separate computers implementing the components.

Figure 5:
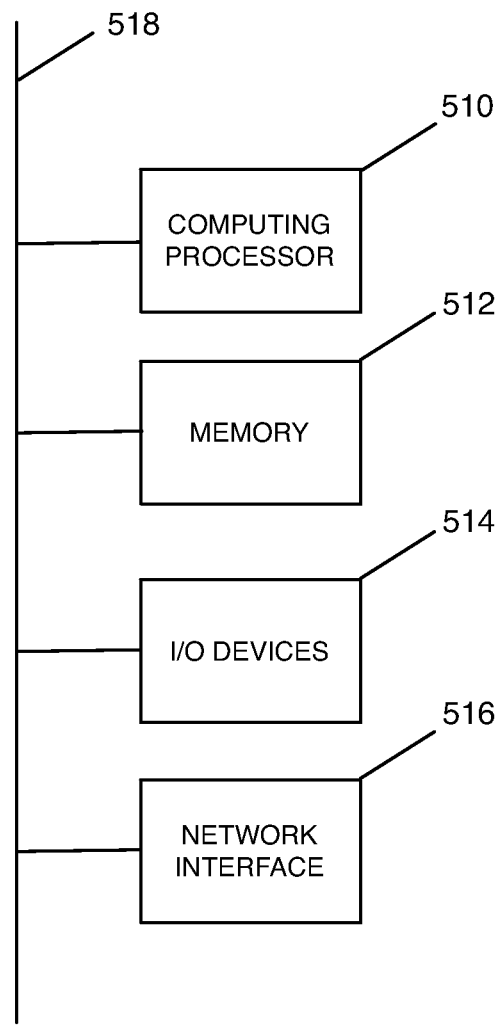
FIG. 5 illustrates, in a simplified block diagram an exemplary hardware implementation of a computing system, in accordance with an embodiment of the invention.

FIG. 5 illustrates in a simplified block diagram an exemplary hardware implementation of a computing system in accordance with which one or more components/methodologies of the invention may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g. keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A system for recommending transfer of ownership of content comprising:
    a processor; and
    a memory containing program code which when executed by the processor is configured to perform operations, comprising:
        determining that a first owner of content is invalid, wherein the content is electronic content stored in a content repository and managed by an enterprise content management system;
        determining at least one characteristic of the first owner including an organizational department that the first owner was a member of during valid ownership by the first owner, by at least one computing processor;
        determining at least one content characteristic of the content, by at least one computing processor;
        determining a second owner of the content based on the at least one characteristic of the first owner and the at least one content characteristic, by the at least one computing processor; and
        generating a recommendation for transfer of ownership of the content, based at least in part on the determination of the second owner.

2. The system of claim 1, wherein the operations further comprise:
    sending the recommendation to the second owner; and
    receiving a response to the recommendation.

3. The system of claim 2, wherein the operations further comprise:
    transferring ownership based on the response.

4. The system of claim 2, wherein the operations for determining the second owner further comprise:
    searching a knowledge base for the second owner corresponding to the first owner of the content and at least one characteristic of the content.

5. The system of claim 4, wherein the operations further comprise:
    upon receiving a response, updating the knowledge base with the first owner, the second owner, at least a portion of the response, and the at least one content characteristic.

6. The system of claim 1, wherein the at least one characteristic of the first owner includes a role.

7. The system of claim 1, wherein the at least one characteristic of the content includes a classification.

8. A computer program product for generating a recommendation for transfer of ownership, the computer program product comprising a non-transitory computer readable storage medium having program code embodied therewith, the program code executable by at least one processor to perform a method comprising:
    determining that a first owner of content is invalid, wherein the content is electronic content stored in a content repository and managed by an enterprise content management system;
    determining at least one characteristic of the first owner including an organizational department that the first owner was a member of during valid ownership by the first owner, by at least one computing processor;
    determining at least one content characteristic of the content, by the at least one computing processor;
    determining a second owner of the content based on the at least one characteristic of the first owner and the at least one content characteristic, by the at least one computing processor; and
    generating a recommendation for transfer of ownership of the content, based at least in part on the determination of the second owner.

9. The computer program product of claim 8, wherein the method further comprises:
    sending the recommendation to the second owner; and
    receiving a response to the recommendation.

10. The computer program product of claim 9, wherein the method further comprises:
    transferring ownership based on the response.

11. The computer program product of claim 9, wherein determining the second owner comprises:
    searching a knowledge base for the second owner corresponding to the first owner of the content and at least one characteristic of the content.

12. The computer program product of claim 11, wherein the method further comprises:
    upon receiving a response, updating the knowledge base with the first owner, the second owner, at least a portion of the response, and the at least one content characteristic.

13. The computer program product of claim 8, wherein the at least one characteristic of the first owner includes a role.

14. The computer program product of claim 8, wherein the at least one characteristic of the content includes a classification.

* * * * *